April 21, 1964     W. O. NYGARD     3,129,690
WARNING DEVICE
Filed June 28, 1963

INVENTOR
William Nygard

United States Patent Office 3,129,690
Patented Apr. 21, 1964

3,129,690
WARNING DEVICE
William O. Nygard, Rte. 1, Box 27, Meadowlands, Minn.
Filed June 28, 1963, Ser. No. 291,542
3 Claims. (Cl. 116—34)

This invention relates to automotive vehicles and, more particularly, to an appliance for vehicles having dual mounted tires, such as heavy trucks and trailers.

It is an object of the present invention to provide apparatus for signalling an imbalance of air pressure in dual mounted vehicle tires, so as to provide a warning to the driver of such condition.

Another object of the present invention is to provide apparatus for signalling an imbalance of air pressure to dual mounted vehicle tires of the type, in which the operating parts are controlled directly by the pressure in the dual mounted tires so as to provide an automatically released signal in response to an imbalance of pressure therein.

Still another object of the present invention is to provide signal apparatus of the type described which can be readily mounted on all types of dual mounted wheels, which will not interfere with the normal operation of the vehicle and its parts, and in which the signal device may be readily observed by the driver of the vehicle through the rear view mirrors thereof.

All of the foregoing and still further objects and advantages of this invention will become apparent from a study of the following specification, taken in connection with the accompanying drawing, wherein.

Figure 1:
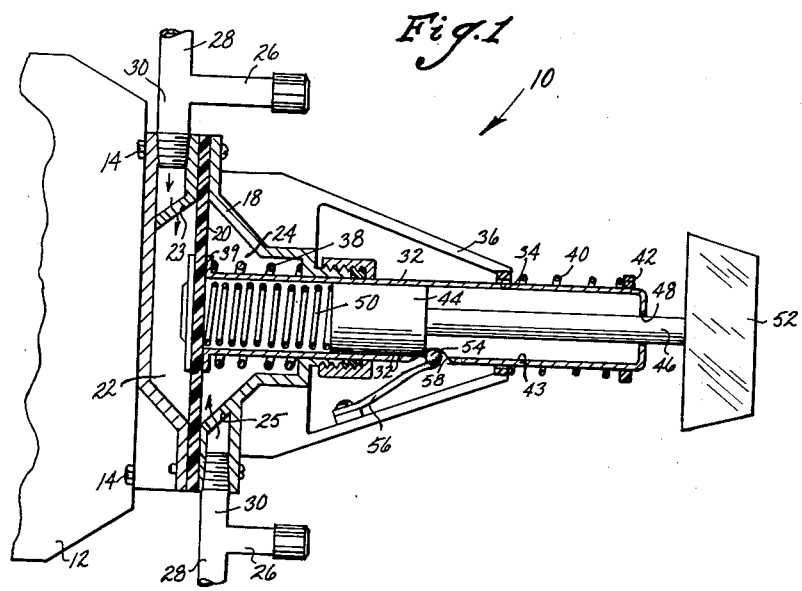
FIGURE 1 is a side elevational view, with parts broken away, to show the details of construction of the present invention, the parts being shown in a normal retracted position indicating a proper balance of tire pressure.
Figure 2:
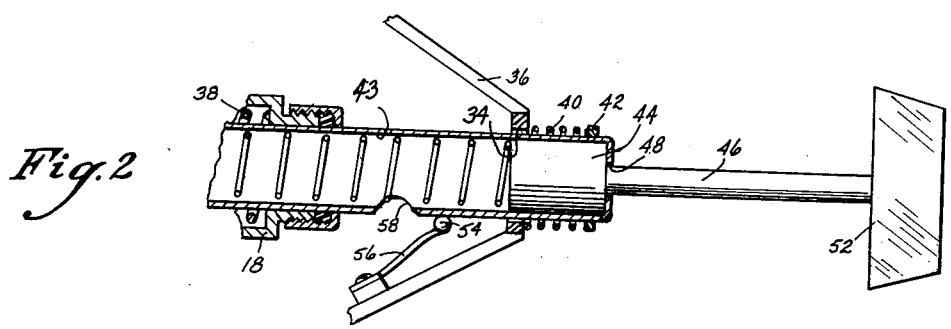
FIGURE 2 is a fragmentary cross sectional view of certain parts of the apparatus shown in FIGURE 1, showing the signal indicator in an extended position, indicating an imbalance of tire pressure.

Referring now to the drawing, apparatus 10 for signalling an imbalance of air pressure in dual mounted vehicle tires made in accordance with the present invention is shown to include a main casing 18 having bolts 14 for central mounted support upon the outer wheel hub 12 of a pair of dual mounted vehicle tires. A flexible diaphragm 20 mounted within the main casing 18, divides the interior thereof into two separate compartments 22, 24, each of which has a port 23, 25, respectively, in communication with a fitting 26.

Each fitting 26 has a valve for supplying pressurized air to the interior of each of the dual tires 16, through one side 28, with the other side 30 of both fittings being threadedly connected to the main casing 18, in pressure sensing communication with each of compartments 22, 24. It will thus be recognized that each fitting 26, thus provides means for simultaneously inflating the tire and maintaining communication between the tire and the interior of the respective compartment 22, 24 of the casing.

A cylinder 32 is connected at one end centrally to the diaphragm 20, with the opposite end thereof being slidably received within a collar portion 34 of an extension 36 of the main casing 18. A pair of substantially equal strength compression coil springs 38, 40, act in opposite directions upon the casing 18 and the opposite ends 39, 42 of the cylinder 32, to yieldably maintain the cylinder 32 in a centered position. However, since the springs 38, 40 are of equal strength, any imbalance in the compartments 22, 24 caused by an unequal pressure in the dual mounted tires, will automatically shift the cylinder 32 longitudinally in either direction from its longitudinally centered position.

A signal indicator assembly is mounted within the interior 43 of the cylinder 32. This signal indicator assembly includes a shaft 46 slidably received within an aperture 48 in the outermost end of the cylinder 32, a piston 44 slidably mounted within the interior 43 of the cylinder 32, and a visible flag 52 mounted upon the outer end of the shaft 46. A compression coil spring 50 acting between the diaphragm 20 and the inner end of the piston 44, exerts an outward pressure upon the piston 44 and shaft 46, to longitudinally displace the flag 52 outwardly from the confines of the outboard tire 16 so as to be visibly observable to the driver of the vehicle through the rear view mirrors thereof, as is shown on the right hand side of FIGURE 3.

Figures 3, 4, 5:
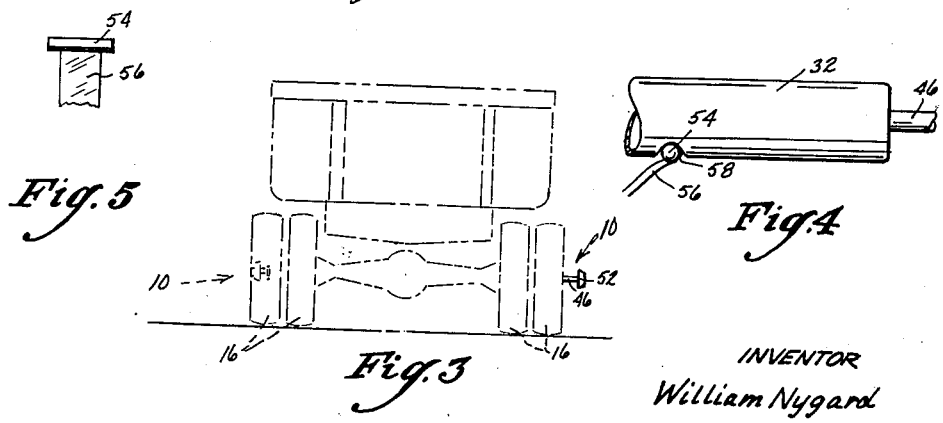
FIGURE 3 is a fragmentary rear elevational view of a vehicle having a pair of warning devices of the present invention mounted upon the dual rear wheels thereof, one of the indicators being in the retracted normal position, and the other one of the indicators being in an outwardly extended position signalling an imbalance in tire pressure.
FIGURE 4 is a fragmentary side elevational view of certain operating parts of the present invention.
FIGURE 5 is a fragmentary plan view of a detent member forming another part of the present invention.

However, a detent in the form of a cross bar 54 mounted upon the free end of a leaf spring 56 secured at its opposite end to the extension 36 of the casing 18, is receivable within a transverse slot 58 formed at the lower side of the cylinder 32, to block the outboard movement of the piston 44 in its normal position shown in FIGURE 1. The portions of the cylinder 32 defining the slot 38 slope gently, so as to serve as a cam for pressing the cross bar 58 against the action of the spring 56, upon longitudinal displacement of the cylinder 32 in either direction. Thus, in the event of an imbalance in air pressure in the compartments 22, 24, longitudinal displacement of the cylinder 32 in either direction will cause ejection of the cross bar 54 from the path of movement of the piston 44, to allow the shaft 46 to move outwardly under the action of the spring 50, to expose the flag 52 to view, as illustrated in FIGURE 3. Once the imbalance of air pressure in the tire has been corrected, and with the shaft 46 being manually held in an inwardly disposed position against the action of the spring 50, the diaphragm 20 will resume its centered position, in which position the cross bar 54 will be receivable into the slot 58 to maintain the piston 44 in its inward position, thus resetting the apparatus for use.

It will thus be recognized that this device can be readily applied to all types of dual mounted vehicle wheels, to provide an instantaneous visible signal in the event of any imbalance of air pressure in the dual mounted tire.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. Apparatus for signalling imbalance of air pressure in dual mounted vehicle tires comprising, in combination, a casing for attachment to the hub of an outboard dual mounted wheel, a signal indicator carried by said casing normally confined within the outline of the outboard wheel and extensible to an outwardly exposed position to visually signal the driver of the vehicle, detent means acting between said casing and said indicator releasably securing said indicator in an inwardly retracted position, pressure balance sensing means carried by said casing in communication with the interior of both dual mounted tires, and release means responsive to an imbalance in the pressure of both tires to release said detent means to allow said indicator to move outwardly into a signal position, said pressure balance sensing means comprising a diaphragm dividing the interior of said casing into two compartments each in communication with one of the dual mounted tires, said spring means comprising an outwardly extending cylinder carried by said diaphragm, a compression coil spring mounted within the inner end of said cylinder, said indicator comprising a shaft having a piston at one inner end slidably carried by said cylinder and a flag carried by the opposite outer end, and said compression coil spring acting between said piston and said cylinder yieldably urging said shaft outwardly.

2. Apparatus for signalling an imbalance in air pressure in dual mounted vehicle tires as set forth in claim 1, wherein said detent means comprises a spring carried at one end of said casing having a cross bar at the opposite end, said cylinder having a transverse slot releasably partially receiving said cross bar in the path of movement of said piston to retain said piston in a retracted position against outward movement of said shaft.

3. Apparatus for signalling an imbalance in air pressure in dual mounted vehicle tires as set forth in claim 2, wherein said release means comprises oppositely acting springs acting between said diaphragm and said casing yieldably maintaining said diaphragm in a centered position, said oppositely acting springs being yieldable upon shifting of said diaphragm to effect longitudinal displacement of said cylinder, said bar in response to longitudinal displacement of said cylinder being drawn out of the path of movement of said piston by the slot defining portion of said cylinder to release said piston for outward movement of said shaft.

References Cited in the file of this patent
UNITED STATES PATENTS

| | | |
|---|---|---|
| 1,173,038 | Roschanek | Feb. 22, 1916 |
| 1,513,740 | Brown | Nov. 4, 1924 |